United States Patent
Chi et al.

(10) Patent No.: US 9,377,823 B2
(45) Date of Patent: Jun. 28, 2016

(54) TOUCH PANEL MODULE AND MANUFACTURING METHOD THEREOF

(71) Applicant: TPK TOUCH SOLUTIONS (XIAMEN) INC., Xiamen (CN)

(72) Inventors: Ho-Hsun Chi, Hsinchu (TW); Tsung-Ke Chiu, Tainan (TW); Jing Yu, Xiamen (CN); Zhuanyuan Zhang, Zhangzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 65 days.

(21) Appl. No.: 13/956,294

(22) Filed: Jul. 31, 2013

(65) Prior Publication Data

US 2014/0036167 A1    Feb. 6, 2014

(30) Foreign Application Priority Data

Aug. 1, 2012 (CN) .......................... 2012 1 0271509

(51) Int. Cl.
*G06F 3/041* (2006.01)
*G06F 1/16* (2006.01)
*G06F 3/044* (2006.01)

(52) U.S. Cl.
CPC ............ *G06F 1/1692* (2013.01); *G06F 1/1643* (2013.01); *G06F 1/1656* (2013.01); *G06F 3/044* (2013.01); *G06F 3/0412* (2013.01); *G06F 2203/04103* (2013.01); *Y10T 29/49128* (2015.01)

(58) Field of Classification Search
None
See application file for complete search history.

(56) References Cited

U.S. PATENT DOCUMENTS

| 2010/0159183 | A1* | 6/2010 | Nishimura | ........ | B29C 45/14639 428/77 |
| 2011/0298739 | A1* | 12/2011 | Wu | ........................ | G06F 3/041 345/173 |
| 2012/0194464 | A1* | 8/2012 | Liu | ........................ | G06F 3/044 345/173 |

* cited by examiner

*Primary Examiner* — Joseph Haley
*Assistant Examiner* — Ifedayo Iluyomade
(74) *Attorney, Agent, or Firm* — Gokalp Bayramoglu; Paul Bendemire (57) ABSTRACT

A touch panel module includes an integrated panel and a casing. The integrated panel defines a transparent region and a non-transparent region around the transparent region. The integrated panel has a covering substrate, a decorating layer disposed on the inner surface of the covering substrate and arranged in the non-transparent region, a sensing electrode layer disposed on the inner surface of the covering substrate and arranged in the transparent region, a circuit layer disposed on the decorating layer and electrically connected to the sensing electrode layer, and a protective layer at least covering par of the decorating layer and part of the circuit layer. The casing is formed by injection molding, wherein one portion of the casing is arranged in the non-transparent region and formed on the protective layer, and another portion of the casing covers a circumferential lateral edge of the integrated panel.

9 Claims, 8 Drawing Sheets

TOUCH PANEL MODULE AND MANUFACTURING METHOD THEREOF

BACKGROUND OF THE INVENTION

This Application claims the benefit of the People's Republic of China Application NO. 201210271509.0, filed on Aug. 1, 2012

FIELD OF THE INVENTION

The present disclosure relates to a panel module; and more particularly, to a touch panel module and a manufacturing method thereof.

DESCRIPTION OF RELATED ART

Currently, many electronic products have been integrating touch panel and display panel. In such products, the touch panel is used as an input interface to omit the keyboard or the space occupied by the physical keys, thereby allowing the electronic products more compact.

The thickness of the touch panel is one important factor that affects the whole thickness of the electronic product. Thus, the industry has developed a single-layer touch panel structure having a lesser thickness. However, because of the lesser thickness of the single-layer touch panel structure, the collision-resistant capacity of such panel's edge area is poor. Thus, in the panel manufacturing process, such kind of the touch panel is prone to generate the problem of damaging the edge area thereof.

To overcome the problem of damaging the edge area of the touch panel, the inventors strive via industrial experience and academic research to present the instant disclosure, which can provide additional improvement as mentioned above.

SUMMARY OF THE INVENTION

One embodiment of the instant disclosure provides a touch panel module and a manufacturing method of the touch panel module having edge area protection effect.

The touch panel module comprises an integrated panel and a casing. The integrated panel has a transparent region and a non-transparent region around the transparent region. The integrated panel further comprises a covering substrate having an inner surface and an opposite outer surface, a decorating layer disposed on the inner surface of the covering substrate and arranged in the non-transparent region, a sensing electrode layer disposed on the inner surface of the covering substrate and arranged in the transparent region, a circuit layer disposed on the decorating layer and electrically connected to the sensing electrode layer, and a protective layer at least covering part of the decorating layer and part of the circuit layer. The casing is formed by injection molding, Wherein one portion of the casing is arranged in the non-transparent region and formed on the protective layer, and another portion of the casing covers a circumferential lateral edge of the integrated panel.

Preferably, the protective layer is an optical protective layer covering the sensing electrode layer.

Preferably, the optical protective layer is made of at least one of silica, silicon nitride, and poly methyl methacrylate.

Preferably, the protective layer is a non-optical protective layer.

Preferably, the non-optical protective layer is made of an ink.

Preferably, the softening temperature of the protective layer is higher than 160° C. and the hardness of the protective layer is higher than 2 H.

Preferably, the sensing electrode layer extends onto the decorating layer.

Preferably, the casing has an outer end surface connected to the outer surface of the covering substrate, and wherein the outer end surface of the casing and the outer surface of the covering substrate are arranged in a coplanar manner.

The manufacturing method of a touch panel module, comprises the steps as follows: forming an integrated panel defining a transparent region and a non-transparent region around the transparent region, wherein the integrated panel comprises a covering substrate having an inner surface and an opposite outer surface; and wherein the forming of the integrated panel comprises the steps as follows: disposing a decorating layer on the inner surface of the covering substrate and arranged in the non-transparent region; disposing a sensing electrode layer on the inner surface of the covering substrate and arranged in the transparent region; disposing a circuit layer on the decorating layer and electrically connected to the sensing electrode layer; and disposing a protective layer on at least part of the decorating layer and at least part of the circuit layer; and forming a casing by injection molding, wherein one portion of the casing is arranged in the non-transparent region and formed on the protective layer, and another portion of the casing covers a circumferential lateral edge of the integrated panel.

Preferably, the forming of the casing comprises the steps as follows: providing a mold assembly defining a cavity; disposing the integrated panel in the cavity of the mold assembly, wherein the circumferential lateral edge of the integrated panel and the mold assembly define a casing space; injecting a melted plastic into the casing space; and carrying out a pressure-holding and cooling process for solidifying the melted plastic to form the casing, wherein the integrated panel and the casing are bonded with each other.

Based on the above, the problem of damaging the edge area of the panel in the panel manufacturing process can be avoided by adapting the technical solution of the instant disclosure.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE EMBODIMENTS

Figure 1:
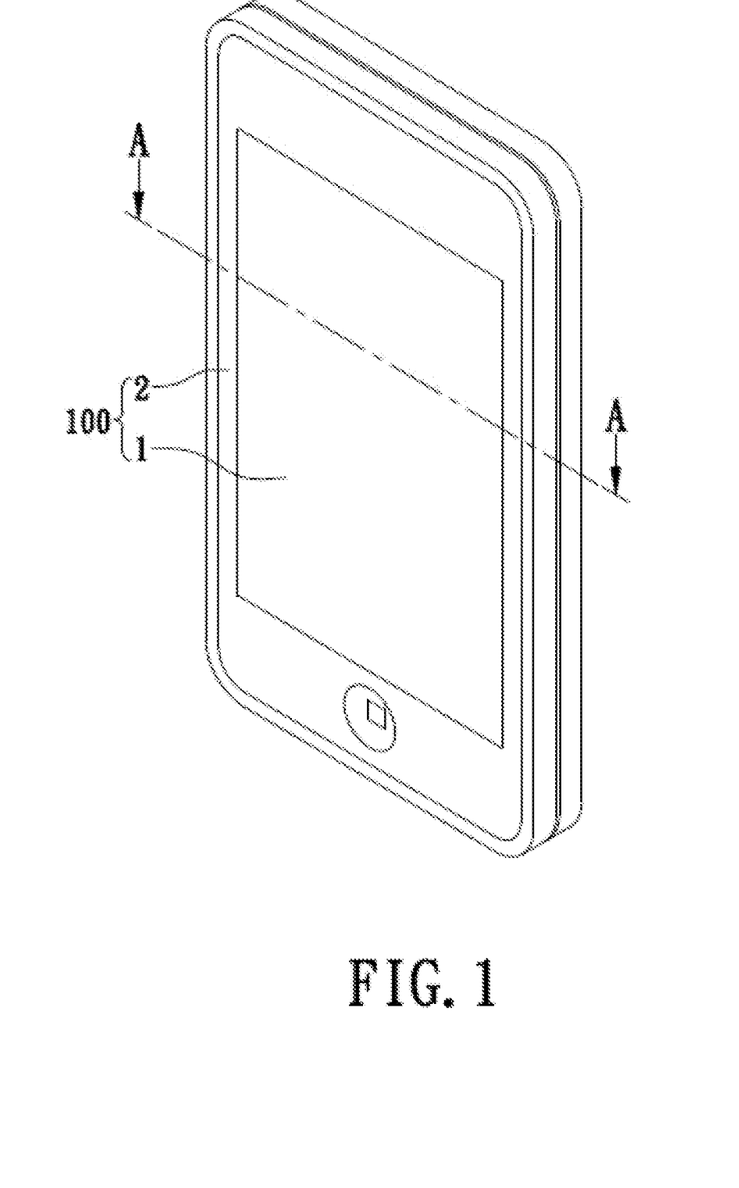
FIG. 1 is a perspective view of an electronic product having a touch panel module of the instant disclosure.

Referring to FIG. 1, which shows an embodiment of the instant disclosure. The embodiment is a touch panel module 100 having an integrated panel 1 and a casing 2.

The integrated panel 1 is referred to as a single-layer touch panel. The single-layer touch panel is a touch panel that all major touch elements formed on a single substrate, and the greater details are described below. The casing 2 is funned by injection molding and surrounds the lateral edge of the integrated panel 1. The integrated panel 1 could be bonded with the casing 2 by an adhesive (e.g. glue) in a conventional way. However, comparing to the conventional way, the instant disclosure that adapts the injection molding to bond the integrated panel 1 and the casing 2 could simplify the bonding process and reduce the forming steps.

Figure 2:
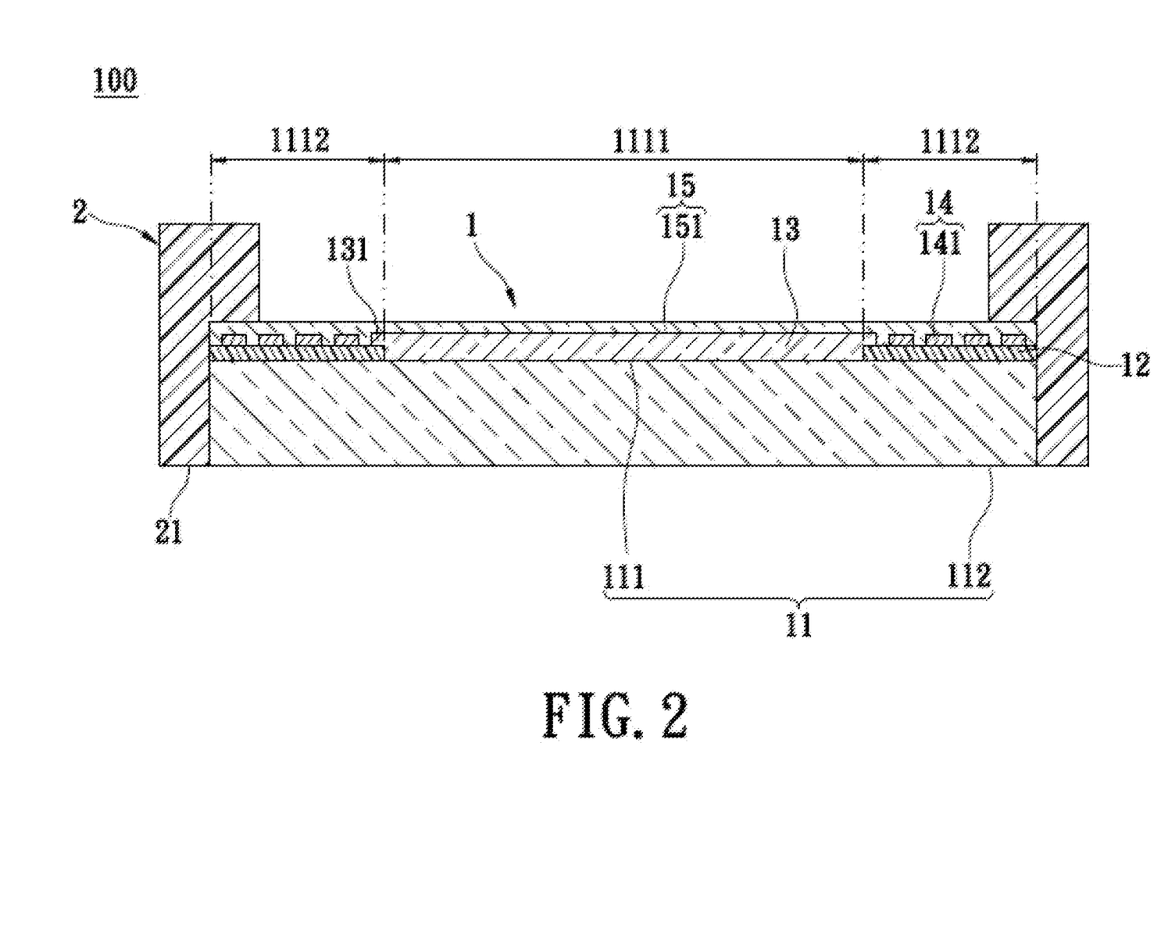
FIG. 2 is a cross-sectional view of one type of the touch panel module along an A-A line of FIG. 1 of the instant disclosure.
Figure 3:
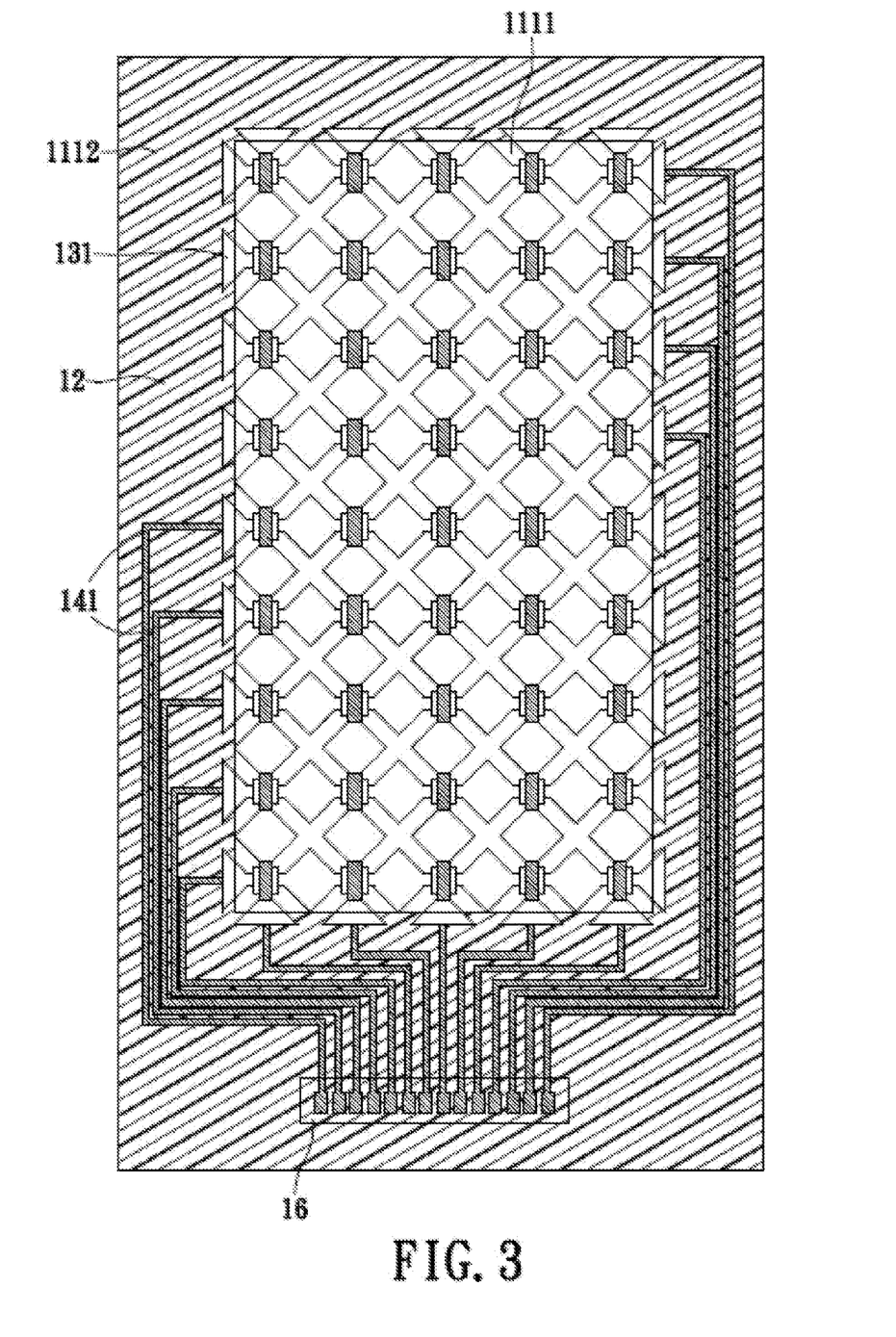
FIG. 3 is a planar view of the touch panel module having an integrated panel according to FIG. 1 of the instant disclosure.

Referring to FIGS. 2 and 3, wherein FIG. 2 is a cross-sectional view of one type of the touch panel module along an A-A line of FIG. 1 of the instant disclosure, and FIG. 3 is a planar view of the touch panel module having an integrated panel according to FIG. 1 of the instant disclosure.

The integrated panel 1 defines a transparent region 1111 and a non-transparent region 1112 around the transparent region 1111. Referring to FIG. 3, the transparent region 1111 has a rectangular shape and the non-transparent region 1112 has a rectangular ring shape around the transparent region 1111. However, the component of FIG. 3 is one of the embodiments of the integrated panel 1 as shown in FIG. 1, and not limited thereto.

The integrated panel 1 has a covering substrate 11, a decorating layer 12, a sensing electrode layer 13, a circuit layer 14, and a protective layer 15. One portion of the casing 2 is arranged in the non-transparent region 1112 and formed on the protective layer 15, and another portion of the casing 2 covers a circumferential lateral edge of the integrated panel 1.

The covering substrate 11 has an inner surface 111 and an opposite outer surface 112. The covering substrate 11 is used to protect and bear each component formed on the inner surface 111 thereof. The outer surface 112 of the covering substrate 11 is provided as a touching interface for a user's finger or a touch pen.

In one embodiment, a specific functional layer (e.g. anti-reflective layer or anti-pollution layer) can be formed on the outer surface 112 of the covering substrate 11, and the covering substrate 11 can be a transparent substrate, which is made of glass having the heat-resistant at least 1000° C. In another embodiment, the material of the covering substrate 11 can be PMMA.

The decorating layer 12 is disposed on the inner surface 111 of the covering substrate 11 and arranged in the non-transparent region 1112. In other words, the decorating layer 12 has a rectangular ring shape. In one embodiment, the decorating layer 12 can be formed with a patterning region thereon (not shown), where the patterning region can be a functional key icon of a cell phone or a logo design. The decorating layer 12 is made of a colored photoresist or an ink having color or patterning design that is visually opaque, so that the circuit layer 14 can be hidden from the view of a user (when observing from the outer surface 112 of the covering substrate 11 of the touch panel module 100).

The sensing electrode layer 13 is disposed on the inner surface 111 of the covering substrate 11 and arranged in the transparent region 1111. Specifically, the sensing electrode layer 13 extends onto the decorating layer 12. In other words, the sensing electrode layer 13 has an extending portion 131 (as shown in FIGS. 2 and 3) covering the decorating layer 12 to satisfy the design demand (such as touch function) of the patterning region of the decorated layer 12. The sensing electrode layer 13 can be a biaxial electrode structure with single layer, as shown in FIG. 3, but not limited thereto.

The circuit layer 14 is disposed on the decorating layer 12 and electrically connected to the sensing electrode layer 13. Specifically, the circuit layer 14 has a plurality of wires 141 spaced arranged on the decorating layer 12. One end of each wire 141 is electrically connected to the sensing electrode layer 13, and the other end of each wire 141 is arranged in a bonding area 16, to electrically connected to a controller (not shown) via a flexible circuit board or a pin for outputting a sensing signal emitted from the sensing electrode layer 13 to the controller.

The protective layer 15 at least covers part of the decorating layer 12 and part of the circuit layer 14. Specifically, the part of the decorating layer 12 and the part of the circuit layer 14 needs to be protected by covering the protective layer 15 for avoiding the color change of the decorating layer 12 and the wire fracture of the circuit layer 14 and further, avoiding the problem of damaging the edge area of the integrated panel 1 during the process of the forming of the casing 2. Moreover, the portion of the circuit layer 14 arranged in the bonding area 16 need not be covered by the protective layer 15 to ensure that the portion of the circuit layer 14 arranged in the bonding area 16 is electrically connected to the controller via the flexible circuit board or the pins.

The protective layer 15 in this embodiment is an optical protective layer 151. The optical protective layer 151 has better transmittance and does not reduce the transmittance of any component covered by the optical protective layer 151. For example, the optical protective layer 151 can be made of at least one of silica, silicon nitride, and poly methyl methacrylate (PMMA).

Specifically the optical protective layer 151 covers the sensing electrode layer 13 for protecting the sensing electrode layer 13.

Moreover, the optical protective layer 151 has better protective effect in a specific condition, for example, the softening temperature of the optical protective layer 151 is higher than 160° C. and the hardness of the optical protective layer 151 is higher than 2 H, but not limited thereto.

Figure 4:
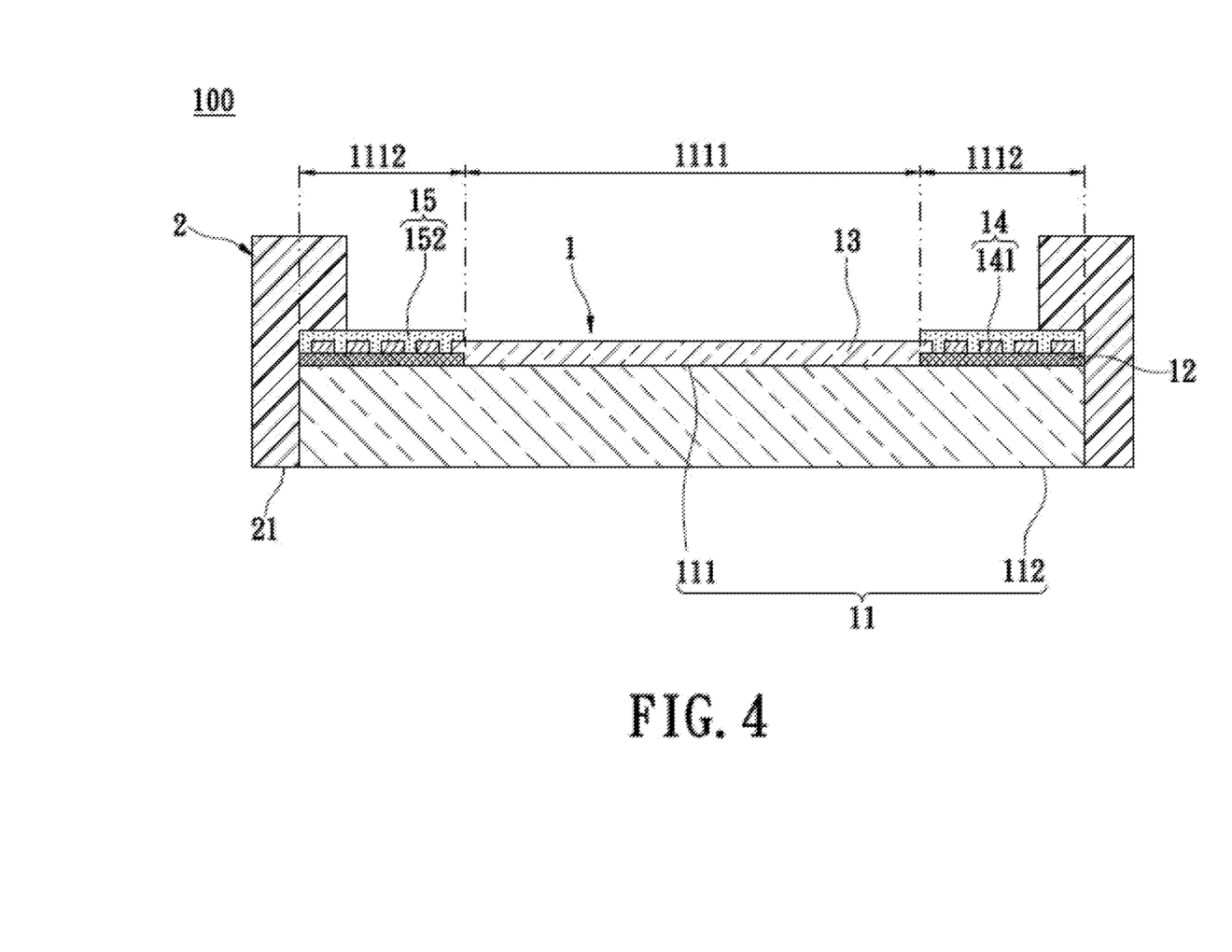
FIG. 4 is a cross-sectional view of another type of the touch panel module along an A-A line of FIG. 1 of the instant disclosure.

Referring to FIGS. 3 and 4, wherein FIG. 4 is a cross-sectional view of another type of the touch panel module along the A-A line of FIG. 1 of the instant disclosure. The structure of FIG. 4 is similar to FIG. 2, but for, the protective layer 15 of FIG. 4 is a non-optical protective layer 152.

In optical property, the non-optical protective layer 152 reduces the transmittance of any component covered by the non-optical protective layer 152. For example, the non-optical protective layer 152 is made of an ink.

Moreover, in structural property, the difference between the non-optical protective layer 152 and the optical protective layer 151 is the non-optical protective layer 152 only covers part of the decorating layer 12 and part of the circuit layer 14.

The material property of the non-optical protective layer 152 is similar to the optical protective layer 151. The non-optical protective layer 152 has better protective effect in a specific condition, for example, the softening temperature of the non-optical protective layer 152 is higher than 160° C. and the hardness of the non-optical protective layer 152 is higher than 2 H but not limited thereto.

The casing 2 has an outer end surface 21 connected to the outer surface 112 of the covering substrate 11, and the outer end surface 21 of the casing 2 and the outer surface 112 of the covering substrate 11 are arranged in a coplanar manner.

Figure 5:
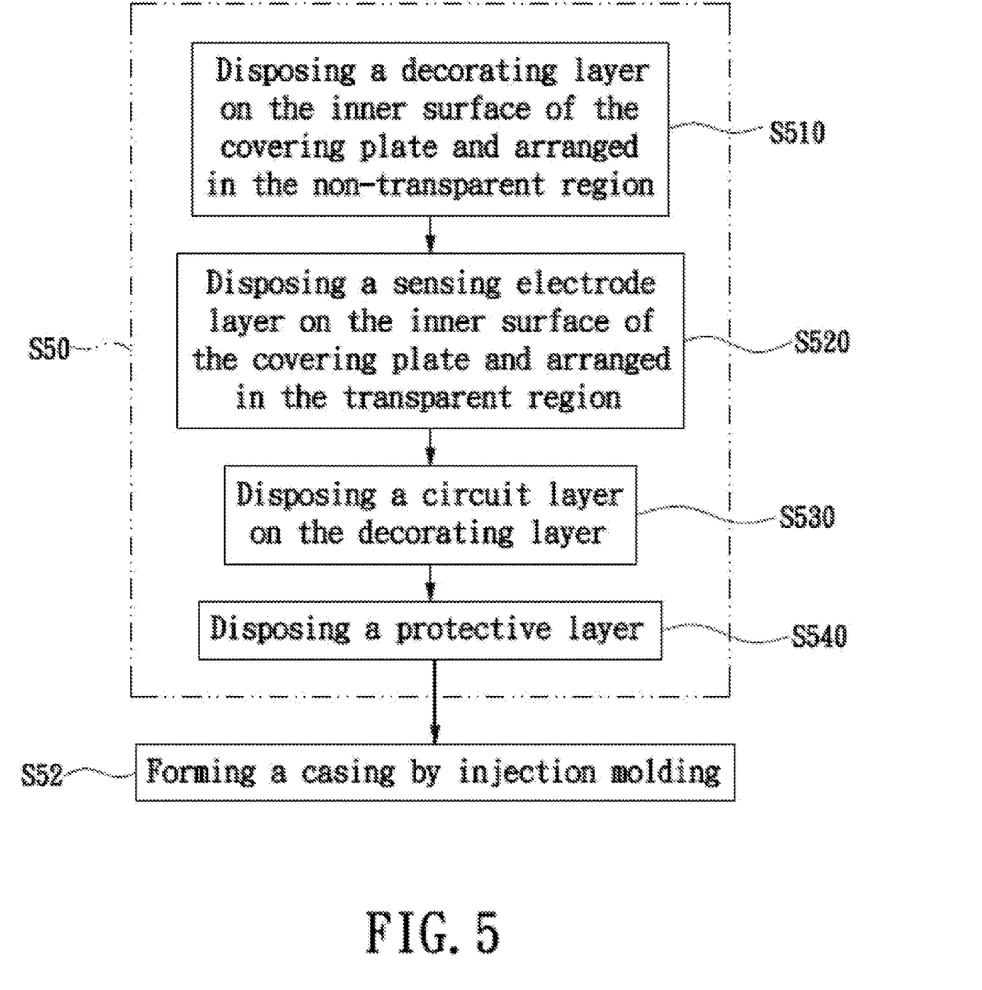
FIG. 5 is a flow diagram of a manufacturing method of the touch panel module of the instant disclosure.

Referring to FIG. 5, which shows a flow diagram of a manufacturing method of the touch panel module of the instant disclosure. The manufacturing method has the steps as follows: forming an integrated panel (the step S50) and forming a casing by injection molding (the step S52). The integrated panel defines a transparent region and a non-transparent region around the transparent region. The integrated panel has a covering substrate having an inner surface and an opposite outer surface.

Specifically, the forming of the integrated panel has the steps as follows: disposing a decorating layer on the inner surface of the covering substrate and arranged in the non-transparent region (the step S510); disposing a sensing electrode layer on the inner surface of the covering substrate and arranged in the transparent region (the step S520), wherein the sensing electrode layer extends onto the decorating layer; disposing a circuit layer on the decorating layer and electrically connected to the sensing electrode layer (the step S530); and disposing a protective layer on at least part of the decorating layer and at least part of the circuit layer (the step S540).

Referring to FIGS. 6 to 9, which show the perspective views of forming the casing in the step S52 by injection molding.

Figure 6:
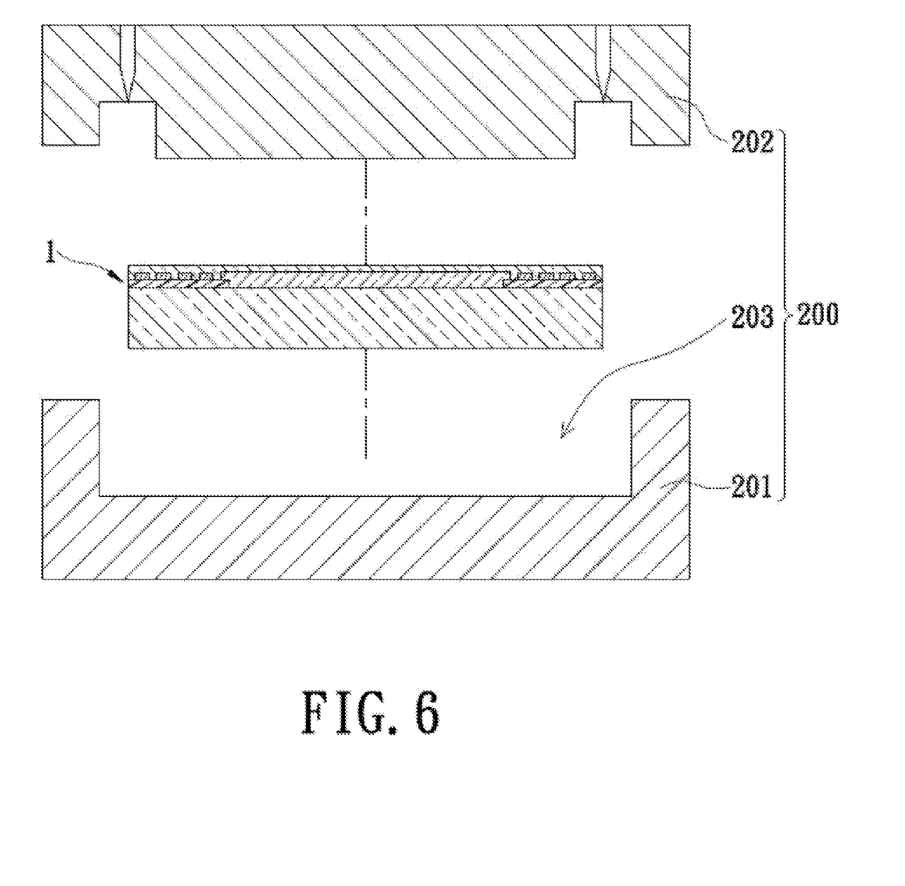
FIGS. 6-9 are the perspective views of forming a casing by injection molding according to FIG. 5 of the instant disclosure.

Referring to FIG. 6, a mold assembly 200 used for an injection molding machine is provided. The mold assembly 200 has a fixing mold 201 and a movable mold 202, wherein the fixing mold 201 and the movable mold 202 define a cavity 203. The cavity 203 has a shape corresponding to a predetermined touch panel module 100, that is to say, the cavity 203 is large enough for accommodating the touch panel module 100 and funning a casing 2.

Figure 7:
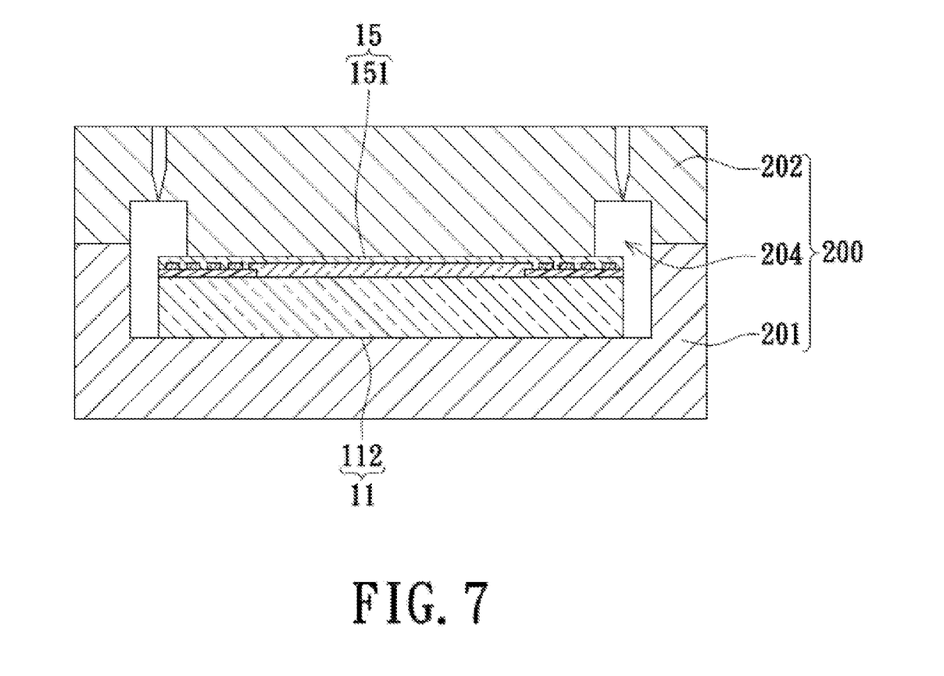

Referring to FIG. 7, the integrated panel 1 is disposed in the cavity 203 of the mold assembly 200, that is to say, the integrated panel 1 is regarded as an insert. The circumferential lateral edge of the integrated panel 1 and the mold assembly 200 define a casing space 204. Specifically, the outer surface 112 of the covering substrate 11 of the integrated panel 1 contacts the inner surface of the fixing mold 201, and the inner surface of the movable mold 202 contacts the protective layer 15 of the integrated panel 1. The protective layer 15 can be the optical protective layer 151 as shown in FIG. 2 or the non-optical protective layer 152 as shown in FIG. 4, wherein the softening temperature of the protective layer 15 is higher than 160° C., and the hardness of the protective layer 15 is higher than 2 H.

Figure 8:
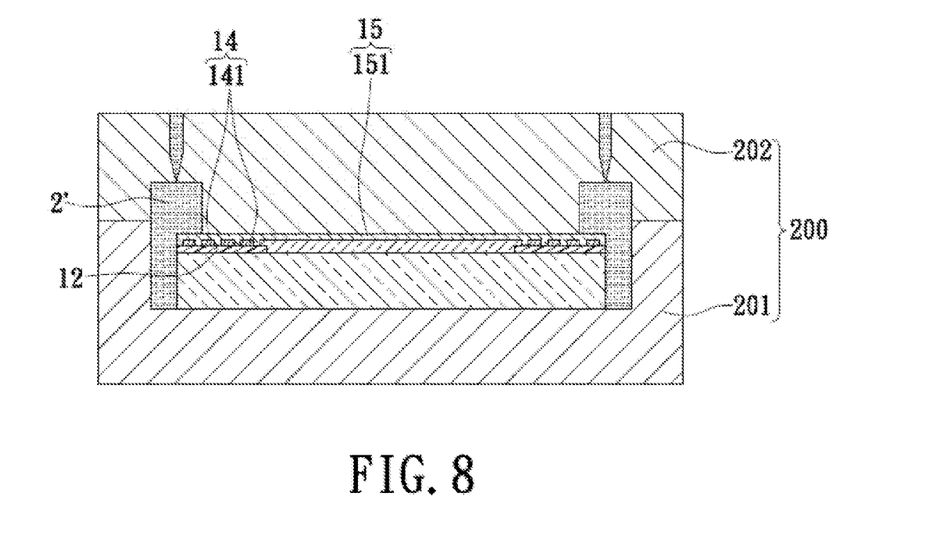

Referring to FIG. 8, a melted plastic 2' is injected into the casing space 204 via the movable mold 202, and then a pressure-holding and cooling process to solidify the melted plastic 2' to form the casing 2 is carried out, so that the integrated panel 1 and the casing 2 are bonded with each other to form the touch panel module 1. Moreover, one portion of the casing 2 is arranged in the non-transparent region and formed on the protective layer 15, and another portion of the casing 2 covers a circumferential lateral edge of the integrated panel 1. The casing 2 has an outer end surface connected to the outer surface of the covering substrate 11, and the outer end surface of the casing 2 and the outer surface of the covering substrate 11 are arranged in a coplanar manner.

Specifically, when injecting the melted plastic 2', the pressure is generated therefrom, so that the decorating layer 12 and the circuit layer 14 are protected (e.g. buffer and heat insulating) by the protective layer 15 for avoiding direct contact with the melted plastic 2' thereby avoiding the color change of the decorating layer 12 and the wire fracture of the circuit layer 14. Moreover, the decorating layer 12 and the circuit layer 14 are protected by covering the protective layer 15 for avoiding the problem of damaging the edge area of the integrated panel 1 during the above processes.

Figure 9:
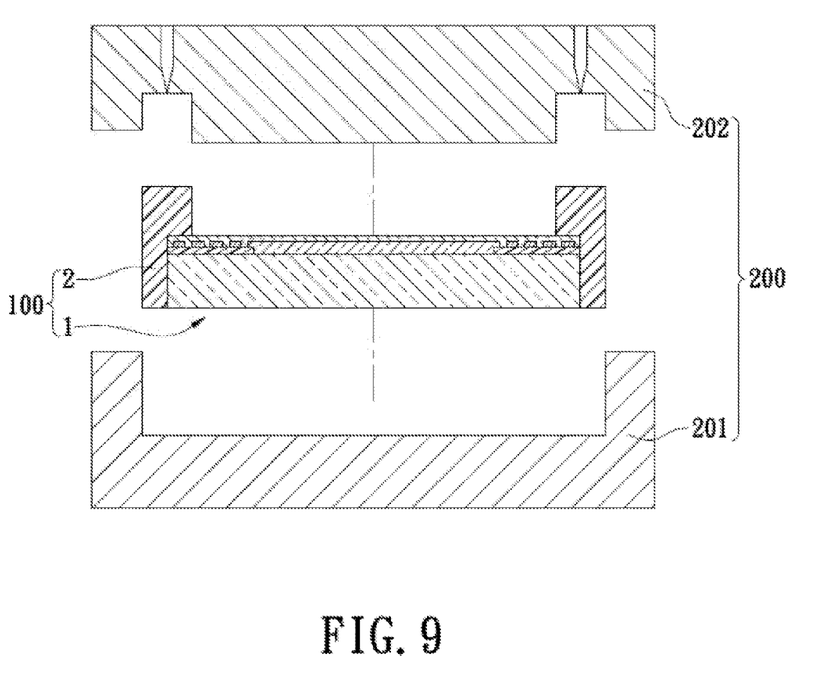

Referring to FIG. 9, the movable mold 202 is moved for taking out the touch panel module 100.

The components in this manufacturing method embodiment are identical to the components in the above embodiment, so that the components do not describe again in this manufacturing method embodiment.

The descriptions illustrated supra set forth simply are the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A touch panel module, comprising:
    an integrated panel having a transparent region and a non-transparent region defined around the transparent region, the integrated panel comprising:
    a covering substrate having an inner surface and an opposite outer surface;
    a decorating layer disposed on the inner surface of the covering substrate and arranged in the non-transparent region;
    a sensing electrode layer disposed on the inner surface of the covering substrate and arranged in the transparent region;
    a circuit layer disposed on the decorating layer and electrically connected to the sensing electrode layer; and
    a protective layer at least directly covering part of the decorating layer and part of the circuit layer, and
    a casing formed by injection molding, wherein one portion of the casing is arranged in the non-transparent region and formed on the protective layer, and another portion of the casing covers a circumferential lateral edge of the integrated panel; and wherein the casing has an outer end surface connected to the outer surface of the covering substrate, and wherein the outer end surface of the casing and the outer surface of the covering substrate are arranged in a coplanar manner.

2. The touch panel module as claimed in claim 1, wherein the protective layer is an optical protective layer covering the sensing electrode layer.

3. The touch panel module as claimed in claim 2, wherein the optical protective layer is made of at least one of silica, silicon nitride, and poly methyl methacrylate.

4. The touch panel module as claimed in claim 1, wherein the protective layer is a non-optical protective layer.

5. The touch panel module as claimed in claim 4, wherein the non-optical protective layer is made of an ink.

6. The touch panel module as claimed in claim 1, 2, 3, 4, or 5. wherein the softening temperature of the protective layer is higher than 160° C. and the hardness of the protective layer is higher than 2 H.

7. The touch panel module as claimed in claim 1, wherein the sensing electrode layer extends onto the decorating layer.

8. A manufacturing method of a touch panel module, comprising the steps of:
    forming an integrated panel defining a transparent region and a non-transparent region around the transparent region,
    wherein the integrated pan& comprises a covering substrate having an inner surface and an opposite outer surface, and wherein the forming of the integrated panel comprises the steps of:

disposing a decorating layer on the inner surface of the covering substrate and arranged in the non-transparent region;

disposing a sensing electrode layer on the inner surface of the covering substrate and arranged in the transparent region;

disposing a circuit layer on the decorating layer and electrically connected to the sensing electrode layer; and directly disposing a protective layer on at least part of the decorating layer and at least part of the circuit layer; and forming a casing by injection molding, wherein one portion of the casing is arranged in the non-transparent region and formed on the protective layer, and another portion of the casing covers a circumferential lateral edge of the integrated panel; and wherein the casing has an outer end surface connected to the outer surface of the covering substrate, and wherein the outer end surface of the casing and the outer surface of the covering substrate are arranged in a coplanar manner.

9. The manufacturing method as claimed in claim 8, wherein the forming of the casing comprises the steps of:

providing a mold assembly defining a cavity;

disposing the integrated panel in the cavity of the mold assembly, wherein the circumferential lateral edge of the integrated panel and the mold assembly define a casing space;

injecting a melted plastic into the casing space; and carrying out a pressure-holding and cooling process for solidifying the melted plastic to form the casing, wherein the integrated panel and the casing are bonded with each other.

* * * * *